PATENTED FEB 20 1973

3,717,047

INVENTOR
LORAN R. HILL
BY
Walter Lewis
ATTORNEY

United States Patent [19]

Hill

[11] 3,717,047
[45] Feb. 20, 1973

[54] PEDAL ATTACHMENT

[75] Inventor: Loran R. Hill, Olney, Ill.

[73] Assignee: AMF Incorporated

[22] Filed: June 9, 1971

[21] Appl. No.: 151,456

[52] U.S. Cl. ................74/594.4, 287/53, 29/453, 29/525
[51] Int. Cl. ..............................B62m 3/08
[58] Field of Search ....74/594.4, 594.1; 29/508, 512, 29/517, 526, 525, 453

[56] References Cited

UNITED STATES PATENTS

| | | | |
|---|---|---|---|
| 2,568,443 | 9/1951 | Gerner et al. | 74/594.4 |
| 2,916,299 | 12/1959 | Gauld | 74/594.4 X |
| 2,226,424 | 12/1940 | Bullock | 74/594.4 |
| 2,567,785 | 9/1951 | Rieger | 74/594.4 X |
| 2,899,842 | 8/1959 | Krokos et al. | 74/594.4 |

*Primary Examiner*—Milton Kaufman
*Assistant Examiner*—F. D. Shoemaker
*Attorney*—George W. Price and Walter Lewis

[57] ABSTRACT

A molded single piece plastic foot pedal member having a lengthwise extending center bushing for rotatably mounting the pedal member on the outer end of a crank has a slot formed in the bushing which extends transversely across the central portion of the bushing. The slot is adapted to have locking means inserted therein to lock the pedal to the crank after the outer end of the crank is inserted into the bushing past the slot.

5 Claims, 4 Drawing Figures

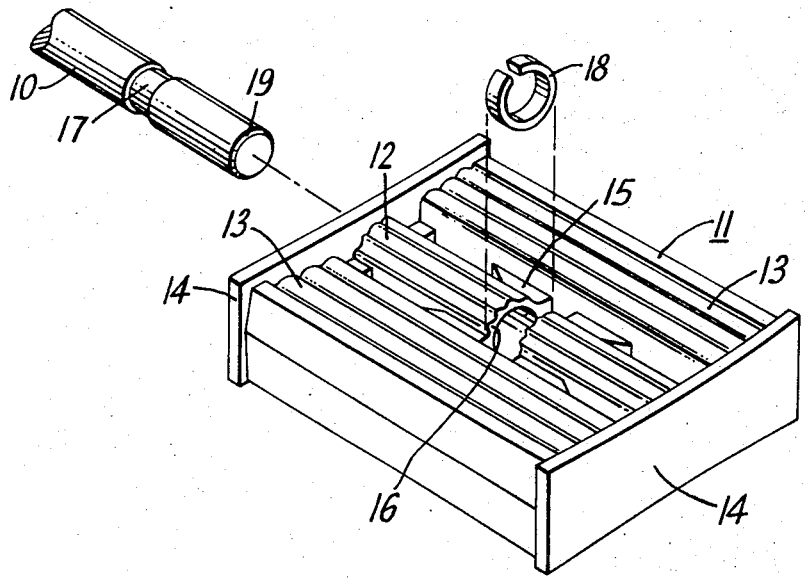

PEDAL ATTACHMENT

This invention relates to a pedal assembly for a tricycle, bicycle, or other pedal operated vehicle, and more particularly, to an improved pedal assembly and an improved method of making the same.

In one prior art form of pedal assembly a swage is formed on the crank adjacent to its bend or elbow. Then a washer is slipped on the crank and then the crank is inserted into the lengthwise extending center bushing of the pedal. The outermost end of the crank extends through the bushing. A washer is slipped on the outermost end of the crank and then a locking cap or the like is placed on the outermost end of the crank. Although this briefly described prior art structure and method has been satisfactory it would be desirable to reduce the cost thereof by reducing the parts and method steps required.

It is an object of this invention to reduce the costs of a pedal assembly by reducing the number of parts and method steps required for the same.

Briefly, in one form of the invention the foot pedal is a single piece molded plastic member. It has a lengthwise extending center bushing for mounting the pedal on the crank. A slot is formed in the bushing. The slot extends transversely across the central portion of the bushing and is adapted to have locking means inserted therein so that when the crank is inserted into the bushing the pedal and crank are locked together. One form of the locking means is an expandable annular locking ring. The locking ring is inserted into the slot and then the crank is inserted into the bushing and through the locking ring to lock the crank to the pedal.

The features of the invention which are believed to be novel are set forth with particularity in the appended claims. The invention itself, however, both as to its organization and operation, together with further objects and advantages thereof, may best be understood by reference to the following description taken in connection with the accompanying drawings in which:

In the drawings only those parts are shown and described which are necessary for an understanding of the invention. Like parts will be assigned the same reference numeral throughout the various Figures.

Figure 1:
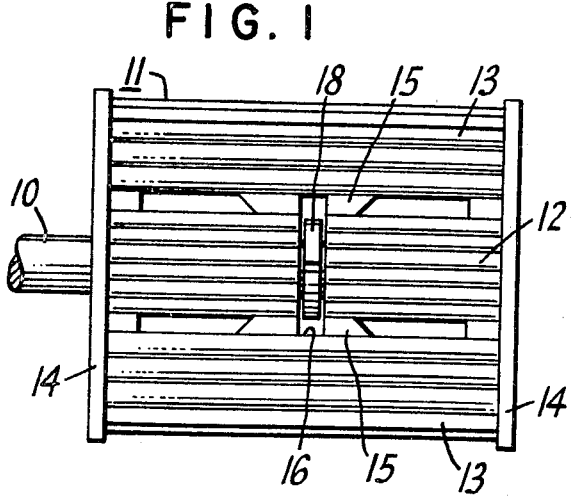
FIG. 1 is a plan view of one form of the invention.
Figure 2:
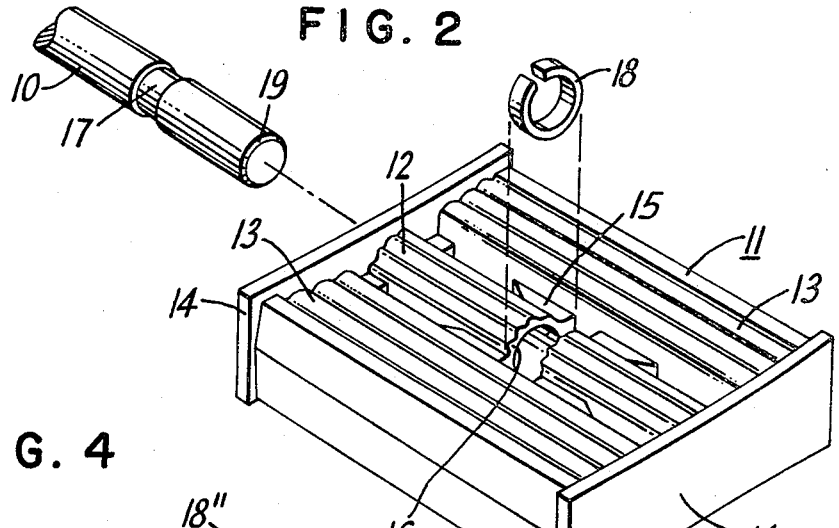
FIG. 2 is an exploded perspective view of the structure shown in FIG. 1.

Referring now first to FIGS. 1 and 2, illustrated therein is a crank 10 having a foot pedal 11 mounted thereon. The foot pedal 11 is a unitary single piece molded plastic member. It has a lengthwise extending center bushing 12 and two spaced lengthwise extending serrated foot tread portions 13 disposed along opposite sides of the bushing 12. The parts 12 and 13 have their corresposing ends connected together by end portions 14. The parts 12 and 13 are also connected together by integral webs 15. In the invention a slot 16 is formed in the central portion of the bushing 12. The slot 16 extends transversely across the bushing 12 and into the webs 15. The crank 10 has a groove 17 formed therein approximately midway of its outer end.

A split expandable resilient annular member or ring 18 is provided for locking the pedal and crank together. The ring 18 may be constructed from metal or plastic. In assembling the pedal and crank together the ring 18 is inserted into the slot 16. Thereafter the crank 10 is inserted into the bushing 12 and forced through the ring 18 until groove 17 is aligned with the slot 16. The ring 18 will snap into the groove 17 so that the foot pedal and crank are locked together. The pedal cannot unintentionally come off the crank inasmuch as the ring 18 is nested in the groove 17 and ring 18 is in position to be engaged with or abutted by the contiguous portions of the bushing 12 which define the slot 16.

The invention is particularly suitable for low cost pedal operated vehicles such as tricycles, sidewalk bicycles, children's fire engines, autos and the like. In such devices it is common to use a low cost single piece crank bent into shape from rod stock and molded plastic pedals. These devices have to be low cost to be attractive to the purchaser, and the invention is directed to that end. It will be appreciated that the saving is actually double that shown since all these vehicles use two pedal assemblies.

Figure 3:
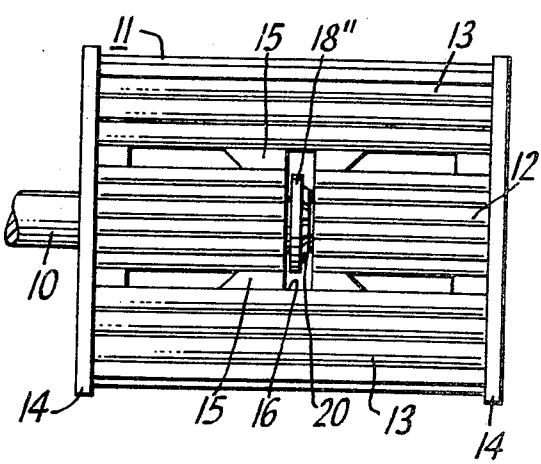
FIG. 3 is a plan view of another form of the invention.
Figure 4:
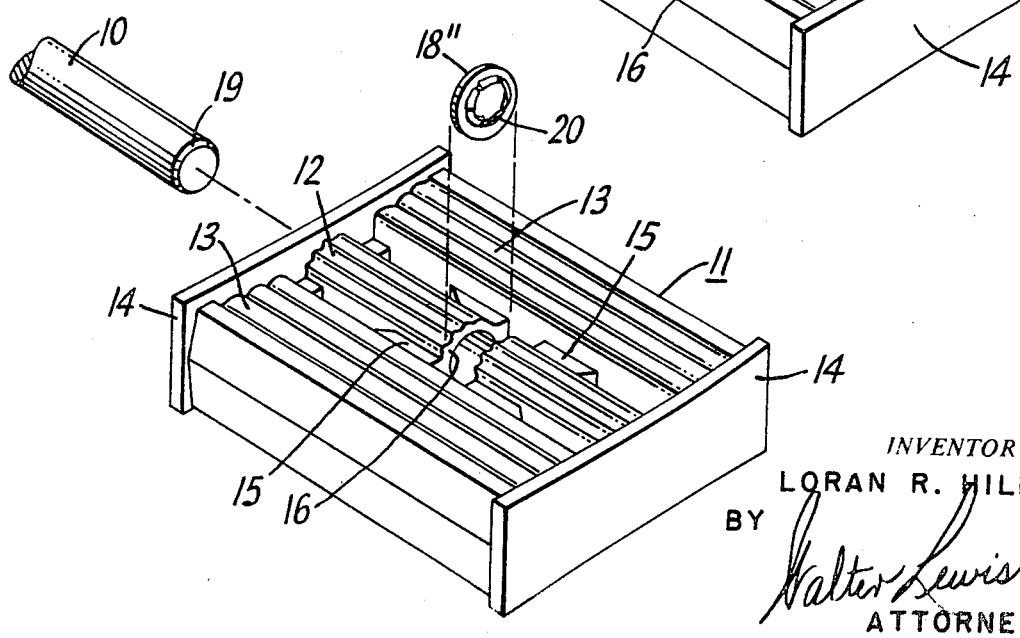
FIG. 4 is an exploded perspective view of the structure shown in FIG. 3.

Referring now to FIGS. 3 and 4, this form of the invention is exactly the same as that just described except for the different locking means to lock the pedal and crank together. This form of the invention illustrates the maximum reduction in parts and method steps which can be achieved with this invention over the previously described prior art. The crank 10 has nothing done to it. In other words there is no groove 17 as in FIGS. 1 and 2. The annular locking ring or member 18'' is not split but it is expandable. Ring 18'' is a one-way drive-on lock washer. Its internal circumference has spaced serrations or teeth 20 formed thereon which can be deformed outwardly as the crank is forced therethrough. The teeth or serrations 20 will lock bite into the circumferential surface of the crank 10 in a manner obvious to those skilled in the art. As before, in assembling the structure the ring 18'' is first positioned in the slot 16 and then the crank 10 is inserted into the center bushing 12 and forced through and past the ring 18''. In both forms of the invention the outermost extremity of the crank has a bevelled surface 19 formed thereon to make it easier to forcibly insert the crank into the locking rings 18 and 18''.

In the invention the shaft part of the crank 10 which is inserted into the center bushing 12 can be about one inch shorter than has been required in the prior art. There are several reasons for this. One is that the prior art swages hereto formed at the corner bend of the crank are omitted and also the washer that is positioned on the crank adjacent to those swages. Also the crank does not have to be inserted clear through the bushing 12 so that a portion of its outermost end protrudes through the pedal. This is because no second washer and locking cap is required at the outermost end of the crank. Elimination of these parts and the extra shaft length they require makes it possible in the invention to shorten up on the outer shaft end of the crank which is inserted into the pedal bushing 12.

It will now be seen that the invention makes it possible to achieve a cost reduction over the prior art. By using the invention it is possible to reduce the numbers of parts or pieces required by the prior art as well as the method steps needed to assemble the same. In addition, a further cost reduction is obtained inasmuch as the outer shaft end of the crank can be shortened as compared to that required by the prior art.

While there have been shown and described particular embodiments of the invention, it will be obvious to those skilled in the art that changes and modifications may be made without departing from the invention, and therefore, it is intended by the appended claims to cover all such changes and modifications as fall within the true spirit and scope of the invention.

What is claimed as new and desired to be secured by Letters Patent of the United States is:

1. A pedal assembly, comprising a crank, a foot pedal, and means retaining said pedal on said crank, said pedal having a lengthwise extending center bushing for receiving the outer end of said crank to rotatably mount said pedal on said crank, a slot extending transversely across the central portion of said bushing, the outer end of said crank being disposed in said bushing, and means disposed in said slot and engaged with the outer end of said crank and contiguous portions of said bushing defining said slot to fix said pedal to said crank, wherein said last mentioned means comprises a split ring, and circumferential groove formed on the outer end of said crank, said ring being disposed in said slot and groove.

2. A pedal assembly, comprising a crank, a foot pedal, and means retaining said pedal on said crank, said pedal having a lengthwise extending center bushing for receiving the outer end of said crank to rotatably mount said pedal on said crank, a slot extending transversely across the central portion of said bushing, the outer end of said crank being disposed in said bushing, and means disposed in said slot and engaged with the outer end of said crank and contiguous portions of said bushing defining said slot to fix said pedal to said crank, wherein said last mentioned means comprises an internally serrated washer, said washer being disposed in said slot and having its internal serrations engaged with the circumference of the outer end of said crank.

3. A pedal assembly, comprising a crank, a foot pedal, and means retaining said pedal on said crank, said pedal having a lengthwise extending center bushing for receiving the outer end of said crank to rotatably mount said pedal on said crank, a slot extending transversely across the central portion of said bushing, the outer end of said crank being disposed in said bushing, and means disposed in said slot and engaged with the outer end of said crank and contiguous portions of said bushing defining said slot to fix said pedal to said crank, said pedal comprising a single piece molded plastic member, said pedal having a pair of spaced serrated foot tread portions disposed along opposite sides of said center bushing, a pair of end portions joining corresponding ends of said tread portions and bushing together, a pair of webs joining opposite sides of the slotted central portion of said bushing to said tread portions, said slot extending to said webs, and said tread portions, center bushing, end portions, and webs comprising integral portions of said single piece molded plastic pedal member.

4. A method of assembling a rotatable foot pedal having a lengthwise extending center bushing to a crank, said method comprising forming a transverse slot in the central portion of said bushing, positioning an annular shaft locking member in said slot, and then inserting the end of said crank into said bushing and through said locking member.

5. In a method as in claim 4, wherein said annular shaft locking member is expandable, and said crank end is forcibly inserted through said locking member to lock said pedal and crank together.

* * * * *